June 22, 1954 H. W. LEVERENZ 2,681,946

COLOR IMAGE REPRODUCTION SYSTEM

Filed Sept. 24, 1949

INVENTOR
Humboldt W. Leverenz
BY
ATTORNEY

Patented June 22, 1954 2,681,946

UNITED STATES PATENT OFFICE 2,681,946

COLOR IMAGE REPRODUCTION SYSTEM

Humboldt W. Leverenz, Princeton, N. J., assignor to Radio Corporation of America, a corporation of Delaware Application September 24, 1949, Serial No. 117,583

14 Claims. (Cl. 178—5.4)

The present invention relates to a method and apparatus for producing color images, and deals more directly, although not necessarily exclusively, with a method and apparatus for producing color television images.

The present invention is further concerned with the high efficiency and high brilliance reproduction of color images in television receiver systems.

It is quite well known in the art to which the present pertains that color images may be produced by either the subtractive or additive color record method. The former of these methods is utilized for the printing of color images or wherever the composite color image is to be viewed by reflected or transmitted white light. The additive method of color image formation is contrariwise related to the formation of an image which in itself is the source of light by which it is visible.

The present invention is more directly concerned with the latter or additive system of color image production as, for example, employed in present-day color television image reproducing systems. In one of the simpler and more common forms of television color image reproducing arrangements, the color image is broken up into red, blue and green additive complementary color records. These images may then be separately reproduced by three kinescopes having respective red, blue, and green phosphors and simultaneously viewed by a mirror system which registers one image upon another.

Another arrangement for reproducing and combining the red, blue, and green records to form the composite color image, is to simultaneously produce each of these color records on a separate kinescope having a white phosphor or cathodoluminescent material. Appropriate red, blue and green filters may then be respectively placed in front of the three kinescopes, and the resulting light images passing through the filter combined and brought in register by some form of optical system. Instead of utilizing actual red, blue and green filters, which interpose a considerable light loss, the respective white phosphor kinescopes may be directed into a dichroic mirror arrangement which inherently reflects only the proper color components and combines them to form the composite color image.

Alternatively, another arrangement for viewing the red, blue and green color records is sometimes referred to as the sequential method wherein a single kinescope with a white-emitting phosphor screen is supplied with image information sequentially forming on the face thereof, the red, blue and green color records of the image to be reproduced. There is then synchronized with the respective formation of these black and white versions of the color records, a rotationally driven filter device which imposes suitable red, blue and green filters between the face of the white phosphor kinescope and the eye so that the eye, through its rather long persistence of vision, may blend the red, blue and green color records and form the illusion of a composite uninterrupted color image.

It is clear that the sequential interpositioning of suitable color filters between the face of the kinescope and the eye also effects considerable reduction in the apparent brilliance of the color image so produced. With the exception of providing separate kinescopes having the proper red, blue and green phosphors on their targets and sequentially keying these kinescopes or for a period corresponding to the reception of the corresponding color record information, and then combining by optical means the color images so formed, there is, at present, no well-known way for overcoming the undesirable losses attending the use of the separate additive color filters in sequential color systems.

It is therefore a purpose of the present invention to provide a simple and economical method and apparatus for producing color images in which the use of selective color filters of any character is not required.

It is another purpose of the present invention to provide an improved and novel method and apparatus for producing color television images by means of a single cathode ray image reproducing tube wherein the efficiency of beam energy transfer to visible light corresponding to the required color records is enhanced to a degree providing much brighter color images than otherwise obtainable.

In one of its more general forms, the present invention contemplates the use of a device for producing a luminescent image whose radiant energy falls in the most part, in the ultraviolet region. This image source defines the individual color records by controlling the intensity of ultaviolet radiation over various portions of its image area. A plurality of photoluminescent targets responsive to the ultraviolet radiated by the image source are then provided. Each photoluminescent target characteristic is such to generate a respective color range embraced by an additive color record upon which the color system is based, for example, red, blue or green.

In one of its more specific forms, as applied to a sequential type color television receiver, the present invention contemplates the use of a single kinescope having a primary target or screen area of cathodoluminescent material adapted to produce a high percentage of ultraviolet radiation when excited by the kinescope electron beam. A plurality of photoluminescent targets are then arranged for sequential excitation by the ultraviolet radiation emitted by the kinescope cathodoluminescent material. Each photoluminescent or secondary target is compounded to produce a different given color radiation upon excitation, this radiation corresponding to a respective additive color upon which the color television system is based. The high efficiency manifested in the transformation of the ultraviolet energy to visible light energy through the agency of the photoluminescent material results in a much higher intensity color image for a given kinescope beam current than heretofore obtainable by systems of equivalent simplicity.

A more complete understanding of the present invention, as well as other objects and features of advantage, will become apparent through the reading of the following specification especially when taken in connection with the accompanying drawings in which.

Figures 1, 2, 2A, 3, 4:
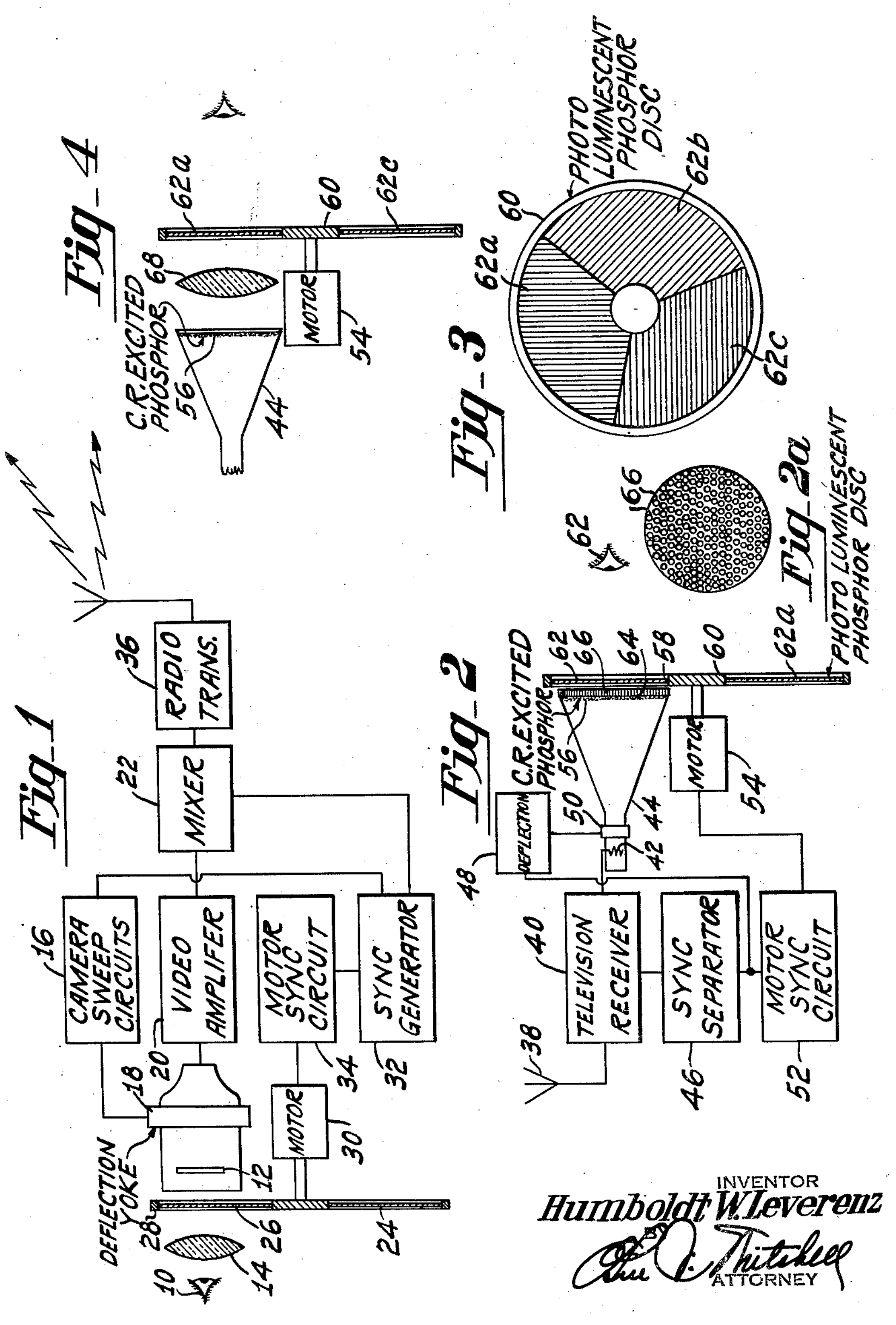
Figure 1 is a diagrammatic and block representation of a typical sequential type television color transmitter.
Figure 2 illustrates one form of the present invention as applied to an otherwise conventional color television receiver adapted to receive and reproduce sequential type color television images.

Figure 2*a* shows one form of window structure for cathode ray image reproducing kinescopes particularly suited for use in the arrangement in Figure 2;

Figure 3 shows one form of photoluminescent target suitable for use in the arrangement shown in Figure 2; and Figure 4 illustrates a modification of the general arrangement shown in Figure 2.

Turning now to Figure 1, there is shown in block form a typical additive type sequential color television transmitting system. Here an object 10 is imaged on the target of electronic scanning device 12, such as an image orthicon, by means of a lens 14. Scanning of the target by the electron beam within the tube 12 is controlled by means of the camera sweep circuits 16 which excite the deflection yoke 18. Output signals from the scanning tube 12 are then fed to the input of the video amplifier 20, whose output is in turn applied to a mixer circuit 22. In order to provide sequential color records of the object 10, a well-known form of color wheel or disk 24 may be employed. As is well-known to those skilled in the art, the disk 24, in one of its more prominent forms, is provided with at least three apertures, such as 26, through which light rays from the object 10 may reach the target of the scanning tube 12. These three apertures are respectively provided with a red, blue and green filter, such as 28. Since the motor 30 is held in synchronism with the camera sweep circuit by means of the sync generator 32 acting through the motor sync circuit 34, the rotation of the color filter disk 24 is such that the respective images scanned by the scanning device 12 sequentially represent red, blue and green color records of the image 10.

In a conventional fashion, the output of the sync generator 32 is also applied to the mixer 22 for mixing with the output of the video amplifier 20. The composite television signal thus obtained is then applied for modulation of the radio transmitter 36.

The receiving system shown in Fig. 2, with the exception of that portion embodying the present invention, is also quite conventional in nature. Signals from the transmitter 36 are intercepted by the antenna 38 and applied to the input of a television receiver 40. The demodulated and amplified video signal is then applied to a control electrode such as 42 of a cathode ray image reproducing tube or kinescope 44. A composite demodulated signal is also applied to both a sync separator circuit 46 whose output in turn controls the beam deflection circuit 48 for the yoke 50, as well as the motor sync circuit 52, for controlling the speed of the motor 54. In prior art arrangements, the screen surface 56 of the kinescope 44 is provided with a cathodoluminescent material excitable by the electron beam in the kinescope to produce a virtually white light. This material may of course be backed by an electron permeable light reflective coating such as a 1000 Å. thick film of aluminum as is well known in the art. The white image formed thereby is, according to the prior art arrangements, made viewable through a plurality of apertures 58 in a color wheel 60. These apertures, in accordance with the prior art arrangement, appropriately carry either red, blue, or green filters as described in connection with the scanning arrangement of Figure 1 so that corresponding black and white images appearing on the screen of the kinescope 44 are viewed through the filter of the color representing the particular color record carried by the image. Through the synchronizing circuits provided, the reproducing color wheel motor 54 is held in synchronism with the scanning filter motor 30 so that the eye 62 will view a sequential reconstruction of the color image 10.

As pointed out hereinabove, the color filters employed in the apertures 58 of the wheel 60 in the television receiver substantially reduce in intensity the light radiated from the screen of the kinescope 44 since the spectral band of wavelengths transmitted by each individual filter represent only a portion of the entire band of wavelengths radiated by the cathodoluminescent kinescope screen.

Considering this in another way, the prior art arrangements provide that the electron beam within the kinescope 44 excite the cathodoluminescent material 56 on the face of the kinescope to form an image color record. The cathodoluminescent material is made of a mixture of individual cathodoluminescent materials, each productive of a discrete spectral band of energy. These individual cathodoluminescent materials are so balanced to produce a virtually white light when excited by the electron beam. Manifestly, then, virtually all of the energy of the electron beam is transformed into a wide band of spectral radiation giving white light. Since the individual filters in the filter disk permit only a portion of this spectral energy to be transmitted, it follows that the efficiency of transfer of electron beam energy to useful light is greatly reduced by the action of the filters.

According to the present invention, however, the cathodoluminescent or cathode ray (C. R.) phosphor 56 is made of a material which, when excited by the electron beam, will produce a preponderance of radiant energy in the ultraviolet region. The disk 60 instead of being provided with color filters is then provided with a plurality of individual secondary targets coated with a photoluminescent material excitable by the ultraviolet radiated from the cathodoluminescent phosphor of the primary target 56. Each of these photoluminescent phosphor targets is made of a material which emits a band of spectral energy corresponding to the red, blue or green filters of the transmitting scanning filters discussed in Figure 1. If then the secondary targets on the photoluminescent target disk are placed immediately adjacent and practically touching the ultraviolet-transmitting outer face of the kinescope 44, the ultraviolet produced by the phosphor 56 will excite the individual photoluminescent targets to provide the desired red, blue or green images as the disk 60 revolves. The eye 62 will then, of course, combine the red, blue and green records thus produced to create a visual reconstruction of the color image 10. It will then be evident that with the arrangement provided by the present invention virtually all of the beam energy of the kinescope 44 is transformed indirectly to only that band of spectral wavelengths needed for a given color record. Since the transformation efficiency of electron beam energy to ultraviolet and violet radiation by cathodoluminescent phosphors is quite high and the transformation of ultraviolet energy to visible energy by photoluminescent phosphors is nearly 100 per cent on a quantum basis, the overall efficiency of the arrangement employing the present invention is much higher than obtainable in prior art systems. This provides the eye with a much more brilliant color image for a given value of beam power.

This embodiment of Figure 2 may be compared to the photographic process of making contact prints in that it is desired that the ultraviolet image produced by the cathodoluminescent phosphor on the kinescope screen 56 be directly transferred to the photoluminescent targets 62 in the disk without any diffusion of the radiant energy rays emanating from the kinescope target. However, in practice, it will be found that the thickness of the glass 64 covering the screen 56 is sufficiently great that the ultraviolet rays leaving the individual points of ultraviolet radiation on the kinescope screen have considerable chance to diffuse before reaching the photoluminescent target 62. This tends to reduce the resolution of the visible color record thereby produced.

Evidently, if the thickness of the kinescope glass is sufficiently small and the spacing between the photoluminescent target 62 and the face of the kinescope is small, the effect of diffusion may be negligible. However, in cases where the face of the kinescope is made necessarily thick, the present invention contemplates the use of a plurality of individual transparent cylinders, such as 66, arranged in close-packed honeycombed fashion over the area of the kinescope screen. These cylinders may be made of glass, quartz, or any other workable transparent material, formed and coated if required, to provide individual radiant energy guides. These light guides will act over elemental areas of the primary target of cathodoluminescent screen to conduct radiant energy from the inside of the kinescope to the outside of the kinescope. By the use of such individual cellular light guides, the diffusion of the image due to the thickness of the tube glass will be cut down greatly, thusly to improve the resolution of the "contact print" made on the secondary target. As shown, these individual cellular light guides 66 are arranged with their axes of transmission virtually perpendicular to the face of the tube and may, although shown circular in form, assume any desired cross-sectional shape. One form of making such a cellular screen covering for a kinescope is to cut a number of quartz cylinders of a very small diameter quartz rod. These individual cylinders may then be bundled and fused together with their longitudinally axes parallel to one another to form a suitable front surface for the kinescope 44. To seal any interstices existing between the rods a thin vacuum tight glass or quartz layer may be placed on the outer surface of the screen.

A front elevational view of the disk 60, provided with three photoluminescent targets 62*a*, 62*b*, and 62*c* in accordance with the present invention, is shown in Figure 3. For convenience, the targets have been shown bounded by radii of the disc but of course may in practice assume any desired shape.

An alternative arrangement for impressing the ultraviolet image formed by the kinescope target 56 on the photoluminescent targets, such as 62, is shown in Figure 4. In this case, an optical lens system, such as 68, adapted to conduct ultraviolet rays without high attenuation, is interposed between the screen surface of the kinescope 44 and the target 62. Although some loss in ultraviolet intensity will be suffered through the use of lens 68, the image produced on the photoluminescent phosphor target 62 in the disk 60 will be much sharper than the "contact printing" arrangement of Fig. 2 since diffusion of the light from the cathodoluminescent target 56 is no longer a problem. This latter arrangement in Fig. 4 also eliminates the need for rather costly and elaborate cellular light guide construction of the kinescope face if diffusion is to be prevented in the "contact printing" method.

It will be clear from the foregoing that although, in accordance with the present invention, the cathodoluminescent phosphor on the primary target or screen of the kinescope radiates energy having a peak in the ultraviolet region, this cathodoluminescent material may well be chosen to emit some blue light so balanced to eliminate the need of a secondary blue photoluminescent target in the disk 60. Accordingly, other individual hues could be imparted by the cathodoluminescent target which could be used to supplement or entirely replace other spectral bands not adequately represented by the photoluminescent phosphors.

In the practice of the present invention, the following short persistent luminescent materials cited only by way of example are found to be suitable for use as cathodoluminescent phosphors:

| | |
|---|---|
| $ZnS:Ag$(700–1400° C.) | Violet and blue-emitting. |
| $Al_2O_3$(1600° C.) | Ultraviolet-emitting. |

This latter $ZnS:Ag$(700–1400° C.)-blue emitting cathodoluminescent material may be employed as discussed above to render unnecessary the provision of a blue photoluminescent phosphor, there being sufficient violet and blue light emitted from the $ZnS:Ag$ phosphor to adequately and sufficiently excite suitable red and green photoluminescent targets.

Furthermore, in the practice of the present invention, also cited purely by way of example, the following short-persistent phosphors are found suitable for use as photoluminescent or secondary targets to be carried by the color wheel 60:

| | |
|---|---|
| $ZnS$(20–40%) : $CdS$(60–80%) : $Ag$ | Red-emitting. |
| $ZnS$(10–40%) : $ZnSe$(60–90%) : $Cu$ | Red-emitting. |
| $4MgO.GeO_2:Mn$ | Red-emitting. |
| $CdWO_4:U$ | Red-emitting. |
| $ZnS$(50–60%) : $CdS$(40–50%) : $Ag$ | Green-emitting. |
| $ZnS$(40–60%) : $ZnSe$(40–60%) : $Ag$ | Green-emitting. |
| $Zn_2GeO_4:Mn$ | Green-emitting. |
| $ZnS:Ag$(700–1400° C.) | Blue-emitting. |

In general the phosphors chosen for application in practice of the present invention as shown in connection with the disc of Figure 3 should have sufficiently short phosphorescence to prevent smearing or blurring of picture elements due to the rotation of the disc. For this reason, the foregoing list of phosphors for the secondary photoluminescent targets may be expanded to include the many short-persistent organic luminescent materials such as blue-emitting aesculin or alloxazine, green-emitting malachite green or the zinc salt of 8-hydroxyquinoline, and red-emitting rhodamine B extra or crystal violet.

It will be obvious to those familiar with the electronic art, as well as those acquainted with the present-day X-ray tube techniques that the color disk carrying the secondary or photoluminescent targets could well be incorporated in the evacuated envelope housing the kinescope gun structure. The color disk itself could be pivoted and rotated by a motor arrangement having its armature within the evacuated envelope and rotating field-producing structure of the motor outside the kinescope envelope. This practice is common in the electronic art and in the case of the present invention would permit the use of a thinner supporting member for the cathodoluminescent target which of course provides better definition in the "contact printing" of the color image.

It is further apparent that the present invention, although described in connection with color television systems utilizing the additive primary colors of red, blue and green, its utility is in no way limited thereto. The virtually three-fold increase in brilliance made available by the present invention over prior art systems is obtained in such a way as to render the present invention applicable to many other color image reproducing systems utilizing different numbers and types of additive color records.

Moreover, although the secondary photoluminescent phosphor targets have been shown as mounted in a rotating disk such that the visible light produced thereby is viewable from the surface of the photoluminescent target away from the ultraviolet kinescope screen, other optical systems, such as a Schmidt system, could be employed wherein the image produced on the photoluminescent target was picked up and utilized from the side of the secondary target adjacent the kinescope screen. The actual optical arrangement employed is therefore a matter of choice and in no way effetcs the novel principles underlying the present invention. For example, a Schmidt optical system may well replace the refractive optical system of Fig. 4 with a considerable increase in efficiency. It is clear, too, that although a kinescope has been shown as a source of ultraviolet and/or blue image color records, any suitable device for producing ultraviolet and/or blue images could be employed in the practice of the present invention with equal success.

Having thus described my invention, what I claim is:

1. In a system in which a color image is to be reproduced by viewing a plurality of different complementary color records, means for producing images of ultraviolet radiation representative of predetermined component color records of the color image, a plurality of photoluminescent targets each responsive to the ultraviolet radiation of said image producing means to radiate a respective visible light image corresponding to a different complementary color record, means for focussing said ultraviolet image onto said photoluminescent targets, and means supporting said luminous targets in moving relation to said image source for effectively combining the visible light images with one another to produce a composite color image.

2. Apparatus according to claim 1 wherein said means for producing said ultraviolet images also produce visible radiant energy falling within predetermined band of wavelengths, and wherein the visible light radiation characteristic of each of said photoluminescent targets is corrected to compensate for the visible radiation of said ultraviolet image producing means whereby to render a correct color balance in the composite color image.

3. Apparatus according to claim 1 wherein said means for producing said ultraviolet focussed images is also productive of visible light energy corresponding to a particular complementary color records and wherein said plurality of photoluminescent targets are responsive to produce visible light image complementary color records which cooperate with the color record produced by said ultraviolet image producing means to form a balanced color image.

4. In a color image reproducing system, in combination, a cathode ray gun structure for forming and directing an accelerated electron beam, a cathodoluminescent primary target for said beam adapted to radiate predetermined wavelength distribution of spectral energy when excited by said beam, a viewing device having a viewing surface divided into a plurality of separate viewing sections, each section having formed thereon a secondary target of photoluminescent material excitable by the predetermined wavelengths radiated by said primary target to produce a different color component wavelength of the color image to be formed, and means for sequentially presenting the individual sections of said viewing device for excitation by radiant energy produced from said primary target.

5. Apparatus according to claim 4 wherein the cathodoluminescent character of said primary target is such to radiate the largest energy component in the invisible ultraviolet region.

6. Apparatus according to claim 4 wherein the character of the cathodoluminescent primary target is such that the wavelengths of the radiation produced thereby fall into at least two groups, the first group in the invisible ultraviolet region and the second in the visible color range corresponding to a color component of the image to be formed.

7. In a color image reproducing system, the combination of a cathode ray gun assembly adapted to form and direct a deflectable accelerated electron beam, means for deflecting and for modulating the intensity of said electron beam in accordance with scanned image information, a primary target positioned such that one surface thereof intercepts said beam, a coating of cathodoluminescent material on the target surface intercepting said beam, the cathodoluminescent material being of a type responsive to said electron beam to radiate a predetermined wavelength of spectral energy, a plurality of secondary targets each holding a surface photoluminescently responsive to the spectral energy radiated by said primary target, each photoluminescent surface being in turn so constituted to secondarily radiate a different spectral visual color component of the color image to be reproduced, and means for sequentially directing the spectral energy of said primary target onto each of said plurality of secondary targets.

8. Apparatus according to claim 7 wherein the cathodoluminescent character of said primary target is such to radiate the largest energy component in the invisible ultraviolet region.

9. Apparatus according to claim 7 wherein the character of the cathodoluminescent primary target is such that the wavelengths of the radiation produced thereby fall into at least two groups, the first group in the invisible ultraviolet region and the second in the visible color range corresponding to a color component of the image to be formed.

10. Apparatus according to claim 7 wherein said cathode ray gun is enclosed in an evacuated envelope having a transparent window whose inner surface supports said primary target and wherein said means for sequentially directing the spectral energy of said primary target comprises in combination, means for movably positioning said secondary target immediately adjacent and in virtual contact with the outer surface of said window.

11. Apparatus according to claim 10 wherein the transparent window of the evacuated envelope embraces a plurality of cellular light guides longitudinally extending from the inner primary surface to the outer surface of said window.

12. Apparatus according to claim 7 wherein said cathode ray gun is enclosed in an evacuated envelope having a transparent window whose inner surface supports said primary target, and wherein said means for sequentially directing the spectral energy of said primary target comprises an optical system for translating and focussing into an image plane rays of wavelength corresponding to the radiation of said primary target, said optical system being positioned adjacent the window of said envelope, and means for selectively positioning said secondary targets in the focussed image plane produced by said optical system.

13. Apparatus according to claim 10 wherein said secondary targets are fixed in a circular locus on a transparent base about a center of rotation for that base and wherein said optical combining means comprises means for rotationally driving said base about its center of rotation at a position such that said secondary targets are moved through the focussed image plane produced by said optical image.

14. In a color television receiver adapted to receive and demodulate picture information for application to at least a first, second and third color channel image reproducing system comprising a cathode ray gun structure for forming and directing a deflectable electron beam, means for sequentially deflecting and modulating the intensity of said electron beam in accordance with image information communicated by said first, second and third channels respectively, a primary target positioned such that one surface thereof intercepts said beam, a coating of cathodoluminescent material on the target surface intercepting said beam, the cathodoluminescent material being of the type responsive to said electron beam to radiate a predetermined wavelength of spectral energy, a plurality of secondary targets each holding a photoluminescent surface responsive to the spectral energy radiated by said primary target, each secondary target surface being in turn so constituted to secondarly radiate a different visual color component of the color image to be reproduced, said color components corresponding to the type of image information represented by said first, second and third channels, and means for sequentially directing the spectral energy of said primary target onto each of said plurality of secondary targets.

References Cited in the file of this patent

UNITED STATES PATENTS

| Number | Name | Date |
|---|---|---|
| 2,086,182 | Boornik | July 6, 1937 |
| 2,378,746 | Beers | June 19, 1945 |
| 2,422,937 | Szegho | June 24, 1947 |
| 2,423,830 | Fonda | July 15, 1947 |
| 2,455,710 | Szegho | Dec. 7, 1947 |
| 2,528,510 | Goldmark | Nov. 7, 1950 |
| 2,532,511 | Okolicsanzi | Dec. 5, 1950 |
| 2,553,182 | Cage | May 15, 1951 |